March 3, 1931.  L. HATCH  1,794,768
DUAL FLUID FILTER
Filed Oct. 11, 1929
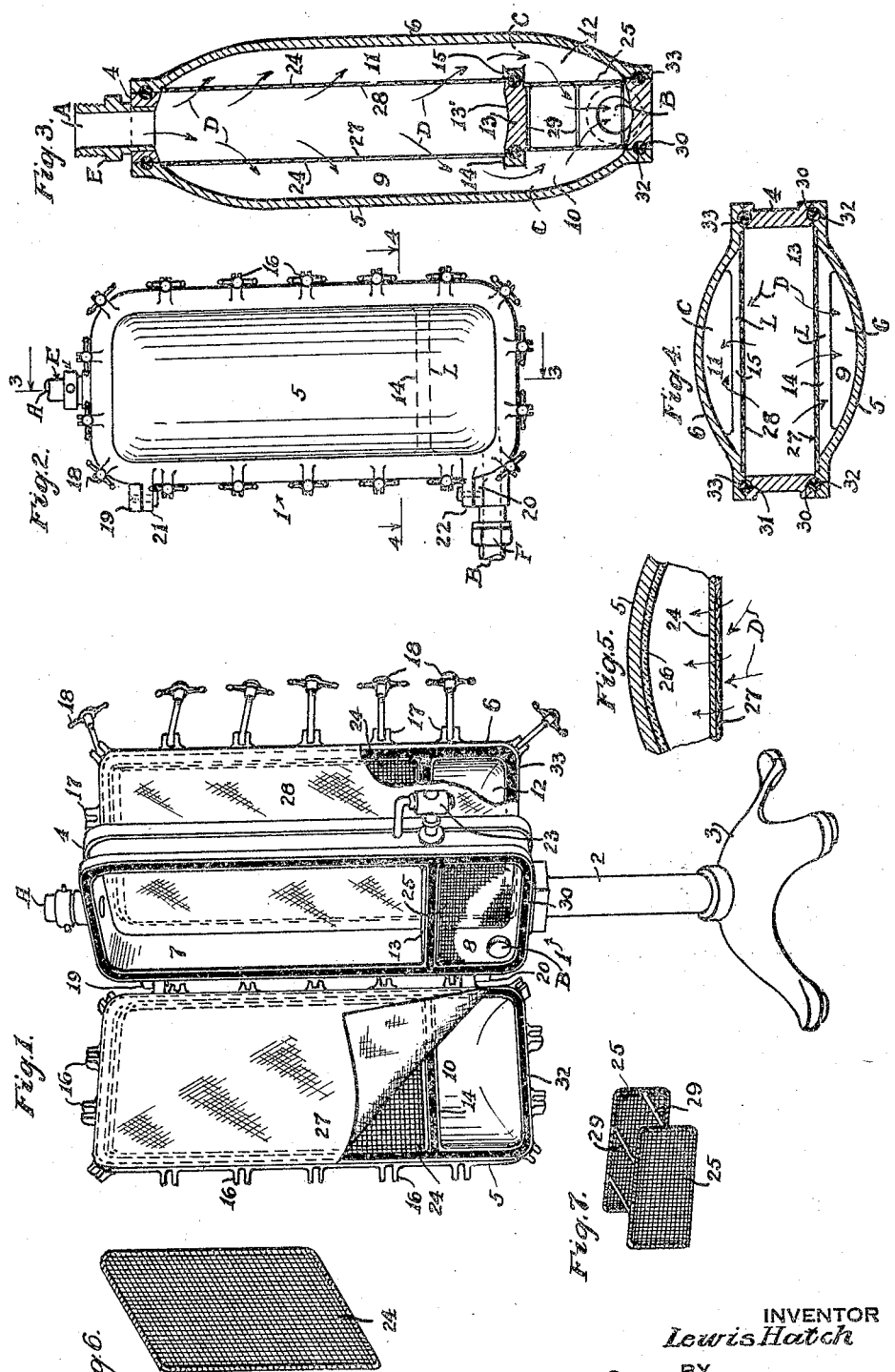
INVENTOR
*Lewis Hatch*
BY
*Harold D. Penney* ATTORNEY Patented Mar. 3, 1931

1,794,768

UNITED STATES PATENT OFFICE

LEWIS HATCH, OF NEW YORK, N. Y., ASSIGNOR TO WISNER MANUFACTURING COMPANY, OF NEW YORK, N. Y., A CORPORATION OF NEW YORK

DUAL FLUID FILTER

Application filed October 11, 1929. Serial No. 398,903.

This invention relates to liquid filtering means, and has for its object two complete or double-way filtering means in one apparatus. In its present form it is adapted for filtering milk, although it may also be used to filter other liquids.

One of the objects of the present invention relates to the manner in which the filters are arranged to filter liquids sequentially and in the straight line of travel of the liquids being treated.

Another object relates to the dual arrangement of two sets of filter media, and in the manner of mounting whereby, upon opening of the covers thereof, the filters and sediment compartments are instantly cleanable or removable.

Another object of the present device relates to the provision of liberal filtering surfaces whereby rapid treatment of large volumes of fluid is accomplished, and due to the liberal filtering surfaces the filter may be operated over large periods of time before it is necessary to open and clean.

Another object relates to the provision of means for draining or flushing intermediate sediment compartments during the operation of the device.

Another object of the present invention relates to the utilization of fluid-tight closures or doors for holding the filter members and associate supports in operative position.

In practice the entire interior of the apparatus, which may come in contact with the milk or other fluids being treated, may be vitreously lined in order to prevent contamination, rust and corrosion, and to permit the apparatus to be easily cleaned and sterilized after each run of the fluid.

These and other objects will readily appear as the herein description proceeds, and it will be obvious that modifications may be made in the herein described invention without departing from the spirit thereof or the scope of the appended claims.

In the accompanying drawings:

Fig. 1 is a perspective view showing the opposite doors of the apparatus open, and the filter members rolled up slightly, showing the screen filter-supporting member.

Fig. 2 is a front elevation showing the outside of one of the doors.

Fig. 3 is an enlarged sectional view taken on the line 3—3, Fig. 2, looking in the direction of the arrows.

Fig. 4 is an enlarged sectional view taken on the line 4—4, Fig. 2, looking in the direction of the arrows.

Fig. 5 is an enlarged sectional fragmental view of the door showing the relative locations of the screen cloth and support member and the vitreous coating on the inside surface of the door.

Fig. 6 is a perspective view of one of the filter support members removed from the apparatus, as for cleaning.

Fig. 7 is a perspective view of the lower dual screen support member.

The apparatus comprising a casing 1, Fig. 1, is shown as supported by a column 2 which is secured to a base 3, the body portion of said apparatus 1 being formed as an open-sided casing 4 having upper and lower fluid ducts comprising an inlet connection A into the upper opening 7 and an outlet B from the lower opening 8. The lower opening 8, being separated from the upper opening 7 by a partition 13, as the sectional construction shown in Fig. 3, has a groove or gutter 13' formed in its upper surface which leads to a drain valve 23. Plural lugs 19 and 20 integrally formed on the outside of the casing 4 serve as supports or loose hinges for the doors 5 and 6. The casing 4 is also provided with a set-in removable rubber gasket 30 molded or otherwise set to encompass the upper and lower openings to insure a fluid and air-tight closed compartment when the doors are closed and locked.

The doors 5 and 6, shown in Figs. 1 to 4 inclusive, being rectangular in shape and having cylindrical walls, as clearly shown in Figs. 3 and 4, form a recess 9—11 on their insides. The sectional portions or cross bars 14 and 15 connect the upright sides of said doors and serve as a rest for the upper screen support members 24. The upper recesses 9—11 of the doors 5 and 6 are suitably grooved to receive and hold the screens 24 in such a manner that they can easily be removed and cleaned.

The doors 5 and 6 are also provided with rubber gaskets 32 and 33 around their upper and lower recesses. To insure air-tight compartments, against leakage, when the doors are closed, integrally slotted lugs 16 are formed on the doors 5 to receive threaded hand clamps 18 which are secured in slotted lugs 17 on the door 6. Each door is also provided with lugs 21—22 to serve as coacting hinge members with the hinge lugs 19—20 on the casing 4.

The doors 5 and 6 are also provided with cloth strainers 27 and 28, suitably held to said doors, and they are supported against pressure by the upper metal screens 24, and supported at their lower portions by another metal screen 25 which is held in the lower opening 8 of the casing 4.

The lower screen member which is composed of two flat screen plates 25, Fig. 7, and suitably spaced apart by holding rods 29, form a supporting surface for the lower section of the cloths 27 and 28.

The inlet A and the outlet B of the apparatus 1 are provided with the usual pipe coupling fittings E and F.

In Figs. 3 and 4 I have shown, by arrows D, a fluid entering through the inlet A and passing downward into the upper chamber 7. This fluid, being under pressure, causes it to pass through the upper part of the screen cloths 27 and 28, into the door recesses 9 and 11 and down through the opening C, into the lower recesses 10 and 12, and again through the lower part of the screen cloths 27 and 28 into the outlet chamber 8.

To facilitate cleaning, the interior of the doors 5 and 6, the casing 4 and other inner surfaces are coated with a vitreous enamel 26, shown more clearly in Fig. 5.

Thus, I have developed a fast acting dual filter of large filtering areas, for rapid treatment of fluids, in volume, in which the stream of fluid to be filtered is passed through a single plane filter in reverse paths, for double filtering in sequential flow of the fluid, the first stage of filtering being of larger area than the second stage, as the first stage removes the larger quantity of residue from the fluid, so that the second stage has considerable less residue to remove.

Having thus described my invention, what I claim is:

1. In a filter of the class described a casing having therein at the opposite ends thereof inlet and outlet ports for a fluid to be passed therethrough, one or more fluid tight closures on said casing contacting therewith along the edges thereof and having cross bars spanning their intermediate portions which recede from said casing to form said fluid passages, a fluid deflecting partition disposed in an intermediate part of said casing transversely thereto and to said closures, the edges of said partition facing the cross-bars in said closures and being located in the same vertical plane with said first mentioned edges, and filtering means, engaged between the contacting edges of said closures and said casing and between the said edges of said partition and said cross-bars, thereby causing said fluid, in passing through said casing, to circumvent said partition, said fluid thereby being repeatedly intercepted by said filtering means as it passes around each edge of said partition into and from each side fluid passage of each closure. Said fluid deflecting partition and said cross-bars having grooves in their opposite edges for packing to provide sealed joints at opposite sides of said filtering means.

2. In a filter of the class described a casing, having therein at the opposite ends thereof inlet and outlet ports, for a fluid to be passed therethrough, a pair of doors on opposite sides of said casing, pivotally connected thereto, said doors, when closed, contacting with said casing along their edges and the lateral edges of said casing, said doors having their intermediate portions receding from said casing, a deflecting partition, disposed in an intermediate part of said casing transversely thereto and to said doors, the lateral edges of said partition facing the recesses in said door and located in the same plane with said first mentioned edges, a pair of cloth filters reinforced by screens, one for each door, engaged between the contacting edges of said doors and said casing and contacting with the said edges of said partition, and means between the edges of said doors and casing to clamp the said doors, casing, partition and filters in fluid tight engagement, thereby causing said fluid, in passing through said casing, to circumvent said partition, said fluid thereby being repeatedly intercepted by said filters as it passes around each edge of said partition into and from the space enclosed by the receding portion of each door.

3. A filter, as described, comprising an open sided casing, a fluid deflecting partition therein dividing the casing into upper and lower chambers, inlet and outlet ports therein separated by said partition, chambered doors for closing the open sides of said casing, draining means for said upper chamber, removable filter supports in said upper and lower chambers, filter means located upon said supports, and means between the doors, casing and partition to engage the filters therebetween in fluid tight engagement, thereby to form a plurality of fluid filtering and conducting passages between the inlet port and the outlet port.

4. A filter, as described, comprising a casing having two open sides, an interiorly located fluid deflecting baffle, inlet and outlet ports in said casing, doors for closing said open sides of said casing, filter supporting screens carried by said doors, filter supporting screens located in said casing below said partition, filters located on opposite sides of said casing, and means for holding said doors, casing and filters in fluid tight engagement.

5. The elements of claim 1, said casing being disposed substantially vertically and said partition dividing the interior of said casing into two chambers, positioned one above the other, the said vertical disposition of said casing enabling a fluid to pass through said filter by gravity.

6. In a filter, as described, a vertical casing having open sides, inlet and outlet ports therein, doors for closing said casing in a fluid tight manner, a fluid deflecting partition dividing the vertical casing into a large upper chamber and a lower smaller chamber, said doors being recessed to form chambers external to the edges of the casing, filters and support means between the door and casing edges, at the upper large chamber, filter and supporting means between the door and casing edges, at the lower chamber, and means for locking said doors, casing partition, filters and support means in operative fluid tight assembly.

7. In combination, a rectangular upright frame having an inlet at the top, an outlet at the bottom and an integral deflecting partition having a longitudinal drain trough in its upper face, said frame and deflecting partition having sealing grooves in their edges, a drain cock connecting through a side of said frame with the said drain trough, closure doors hinged to said frame, said doors being arcuately recessed to form side fluid passages, said doors also having integral cross bars having sealing grooves to register with the grooves of said deflecting partition; screens arranged in spaced relation within said frame and doors, to form a central fluid passage; and filter cloths arranged over said screens, and through which fluid twice passes by gravitation on its way from the inlet to the outlet of said casing.

8. In combination, a frame having an inlet at its top, an outlet at its bottom, and a horizontal deflecting partition having a longitudinal drain trough; doors hinged to said frame and having vertically extending arcuate recesses; spaced screens defining a central vertical fluid passage and vertical side fluid passages within said recesses and outward of the plane of said frame; and filtering means resting against said screens for permitting rapid gravitational flow of fluid therethrough.

9. In combination a frame having an inlet, an outlet and a horizontal deflecting partition having a drain trough in its upper face, means for draining said trough, doors hinged to said frame, said doors each having an outwardly curved wall to provide an interior vertical channel and cross bars adapted to register with the said deflecting partition when said doors are closed and locked, screens carried on said doors and resting on said cross-bars; a double screen unit disposed between the deflecting partition and the bottom of said frame; and filter cloths arranged inside of the screens on said doors, outside of said screen unit and between said cross bars and said deflection partition so that the fluid gravitational flow will be first against and through said clothes in both its outward and inward travel through said screens.

10. In a filter, a frame having an inlet, an outlet and a horizontal deflecting partition, doors each having a vertical channel and a cross bar; screens above said partition defining a central fluid passage and side fluid passages; screens below said partition; and filter cloths disposed inside of the upper screens, between said cross-bars and said deflecting partition, and outside of said lower screens to support said filter cloths against gravitational outflowing and inflowing thrusts, as the fluid leaves the central fluid passage above the partition, and again as it enters said central passage below the said partition in its flow to the outlet.

11. In a filter, a frame having an inlet, an outlet and a horizontal partition having a drain trough; doors, each having a vertical cross-sectionally arcuate recess in the inner face thereof, and a cross-bar extending across the width of said recess; a set of screens supported by said cross bars to define a central fluid passage and side fluid passages formed by the recesses in said doors; a set of screens occupying the space between said partition and the bottom of said frame; and filter cloths disposed on the inner sides of the upper screens, between the cross bars and said partition and on the outer sides of the lower screens.

Signed at New York in the county of New York and State of New York this 13th day of September A. D. 1929.

LEWIS HATCH.